United States Patent

[11] 3,626,009

[72] Inventors Wilfried Zecher
Cologne-Stammhein;
Rudolf Merten, Leverkusen, both of Germany
[21] Appl. No. 735,523
[22] Filed June 10, 1968
[45] Patented Dec. 7, 1971
[73] Assignee Farbenfabriken Bayer Aktiengesellschaft
Leverkusen, Germany
[32] Priority July 12, 1967
[33] Germany
[31] F 52932

[54] PROCESS FOR THE PRODUCTION OF ALDIMINO- AND KETIMINO-NITROARYL ETHERS
2 Claims, No Drawings

[52] U.S. Cl. .................................................. 260/566 F,
260/465 E, 260/472, 260/509, 260/519, 260/78 R
[51] Int. Cl. ........................................................ C07c 119/00
[50] Field of Search ........................................... 260/566 F, 566

[56] References Cited
OTHER REFERENCES

Bost et al., J. Am. Chem. Soc., Vol. 57 pp. 2,368– 69 (1935)

Kir–Othmer, Encyclopedia of Chemical Technology, Vol. 12, pp. 111– 113 (1952)

*Primary Examiner* — Bernard Helfin
*Assistant Examiner* — Gerald A. Schwartz
*Attorney* — Burgess, Dinklage & Sprung ABSTRACT: Production of aldimino- and ketimino-nitroaryl ethers of the formula

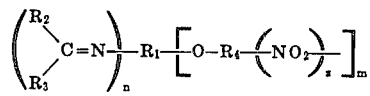

in which $R_1$ is $(m+n)$-valent aryl, $R_2$ and $R_3$ each individually is selected from the group consisting of hydrogen, alkyl of up to eight carbon atoms, cycloalkyl, aralkyl, aryl and heterocyclic, with the proviso that $R_2$ and $R_3$ when taken together with the adjacent carbon atom to which they are attached form a ring selected from the group consisting of a 5- to 7-membered isocyclic and heterocyclic ring, m and n each individually is a number from one to two, $R_4$ is $(z+1)$-valent aryl, and z is an number from one to two, by reacting the corresponding Schiff's base of the formula

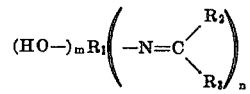

in which $R_1$, $R_2$, $R_3$, m and n are the same as defined above with an aromatic halo-nitro compound of the formula
$X - R_4(-NO_2)_z$
in which X is fluoro, chloro or bromo, and $R_4$ and z are the same as defined above, e.g. at about $-20°$ to $+200°$ C., in the presence of an acid acceptor; said ethers being intermediates for producing plant protection agents, e.g. fungicides, dyes and plastics auxiliaries, e.g. for preparing polyimide molded bodies.

PROCESS FOR THE PRODUCTION OF ALDIMINO- AND KETIMINO-NITROARYL ETHERS

This relates to a process for the production of aldimino- and ketimino-nitroaryl ethers.

It is already known that nitrochlorobenzenes can be condensed with alkali metal phenolates to form nitroaryl ethers. It is also known that N-alkylaminophenols can be obtained by heating benzylideneiminophenol with dialkyl sulfates at temperatures around 100° C. (Chem. Ber. 60, page 1,402).

We have now found that aldimino- or ketimino-nitroaryl ethers can be obtained by a process in which a Schiff's base of the general formula:

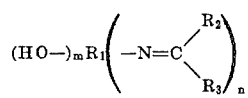

in which $R_1$ represents an $(m+n)$-valent aryl radical; $R_2$ and $R_3$ may be the same or different and represent hydrogen or an alkyl, cycloalkyl, aralkyl, aryl or heterocyclic radical, or may together form a 5- to 7-membered isocyclic or heterocyclic ring; and $m$ and $n$ may be the same of different and represent 1 or 2, or a precursor thereof is reacted with an aromatic halonitro compound of the general formula:

$$X-R_4(-NO_2)_z \quad (II)$$

in which X represents fluorine, chlorine or bromine, $R_4$ represents an aryl radical of the valency $(Z+1)$, and Z stands for the number one or two at a temperature in the range of from −20° C. to 200° C. and preferably in the range of from 50° C. to 140° C. in the presence of an acid acceptor. The invention also covers compounds corresponding to the formula:

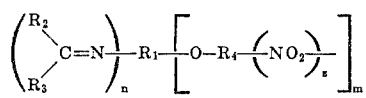

in which $R_1$ represents an $(m+n)$-valent aryl radical, $R_2$ and $R_3$ may be the same or different and each represent hydrogen or an alkyl, cycloalkyl, aralkyl, aryl or heterocyclic radical or may together form a 5- to 7-membered isocyclic or heterocyclic ring; $m$ and $n$ may be the same or different and represent one or two;
$R_4$ represents an aryl radical of the valency $(Z+1)$; and Z represents one or two.

Instead of the Schiff's bases, it is also possible to use their trimers.

Preferred aryl radicals include those of benzene, naphthalene, anthracene, anthraquinone, diphenyl, diphenylmethane, diphenylether, toluene, xylene and ditert.-butyl benzene. These radicals may also be mono- or poly-substituted, for example by alkyl, halo, nitro, alkoxy, dialkylamino, carboxy, carbalkoxy, sulfonic acid and cyano groups.

Lower alkyl radicals with up to eight carbon atoms such as, for example those of methane, isobutane, propylene and cyclohexane, are preferably used as alkyl radicals. Where $R_2$ and $R_3$ are directly attached to one another, cyclopentane, cyclohexane, cycloheptane or piperidine rings are preferentially formed. They may also be mono- or poly-substituted, for example by alkyl, halogen, nitro, alkoxy, dialkylamino, carbalkoxy and cyano groups.

The Schiff's bases used as starting materials in accordance with the invention may be prepared by methods known per se, for example, by condensing aldehydes or ketones with primary aromatic amines, optionally in the presence of suitable catalysts. The Schiff's bases may be used in the dry state, alternatively they may actually be prepared in the reaction medium from the amine and the carbonyl compound.

The following compounds are mentioned as examples of Schiff's bases that may be used as starting materials in accordance with the invention:

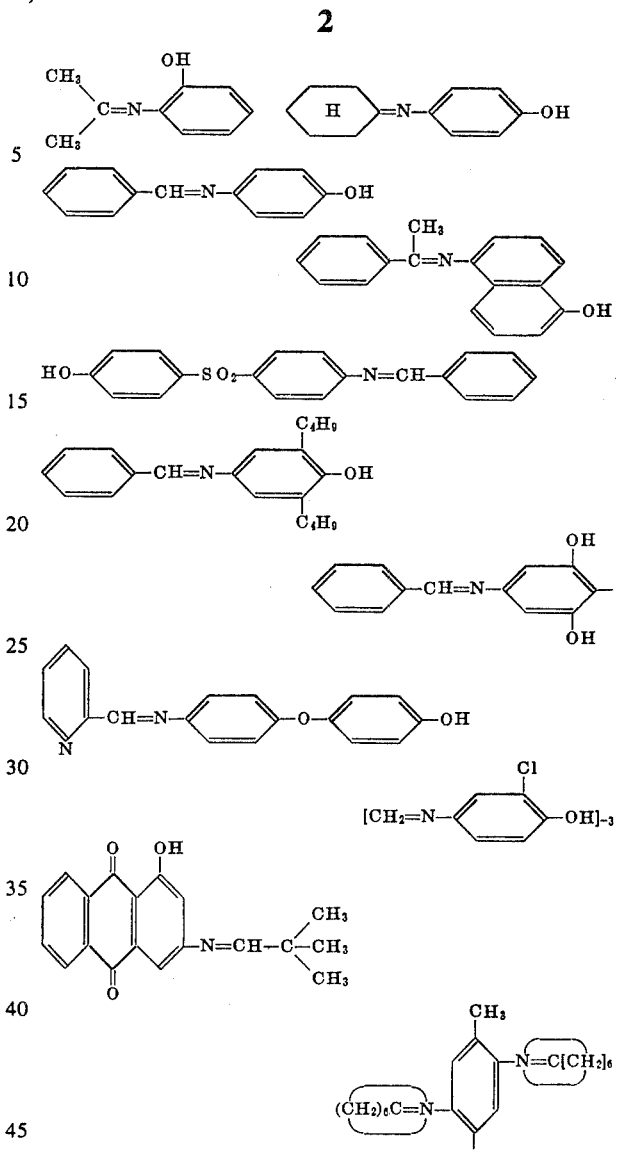

The following are examples of suitable aromatic halonitro compounds which may also be prepared by known methods:

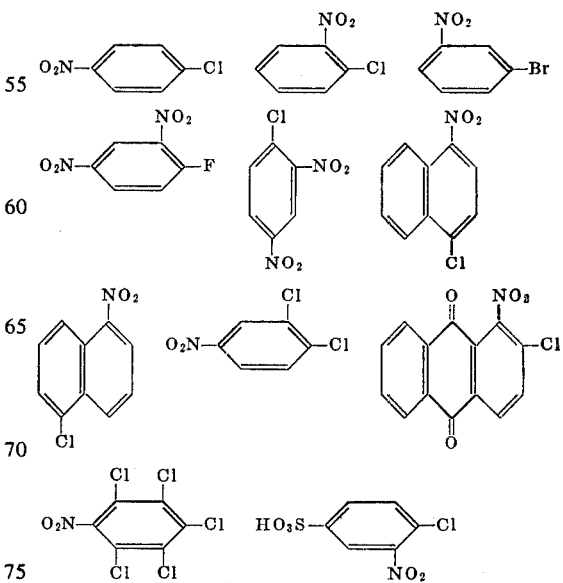

The reaction according to the invention is illustrated by the following embodiment:

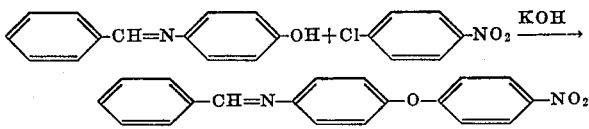

As a rule, the reaction is carried out in solvents such as, for example, tetramethylene sulfone, dimethyl sulfoxide, dimethyl acetamide, N-Methyl pyrrolidone, pyridine, water, ethanol, nitrobenzene, acetone or mixtures thereof. It is in some cases of advantage to carry out the reaction in an autoclave, for example, where low-boiling solvents are used.

The hydroxides and oxides of the alkali and alkaline earth metals, potassium carbonate, sodium carbonate and triethylamine, or the alkali metal and alkaline earth metal salts of aldimino- and ketiminophenols, are all examples of suitable acid acceptors.

The reaction is generally carried out by dissolving the components, aromatic halo-nitro compound and iminophenol, followed by the dropwise addition at room temperature of the acid acceptor, generally in the form of an aqueous solution. The reaction mixture is then heated to the reaction temperature which is generally in the range of from 60° C. to 140° C., and the reaction is completed at this temperature. It is also possible, however, to add the acid acceptor or one of the two components after the reaction temperature has been reached. It is of advantage in some cases to operate in the absence of water. In this case, the phenolate may be directly added or prepared from iminophenol and hydroxide in the solution, the solvent for the acid acceptor distilled off and the halonitrobenzene subsequently introduced. The procedure as a whole may be simplified in many cases by using instead of the Schiff's bases themselves their starting products, namely the carbinol compound and aminophenol, which react with one another to form the iminophenol, optionally through azeotropic distillation, and may be directly further reacted in the solution.

The reaction may be carried out either continuously or in batches and is promoted by suitable catalysts, such as, for example, copper powder, cuprous oxide or copper salts.

In general, the reaction products crystallize out of the reaction mixture in a form which, even at this stage, is highly pure, optionally following the addition of water. They may then be directly further reacted to form aminonitroaryl ethers, for example by adding hydrochloric acid or sulfuric acid, distilling of the aldehyde or the ketone with steam and precipitating the aminonitroaryl ether from the solution of the hydrochloride either with NaOH or with another base. The compounds obtained by the process according to the invention represent intermediates for the production of plant protection agents, particularly those of the kind with a fungicidal effect, and for the production of dyes. They may also be used as plastics auxiliaries.

The usefulness of the compounds obtainable according to the process of this invention is shown as an example for 4-[benzilidene-imino]-4'-nitrodiphenylether: To 300 g. of 4-[benzilidene-imino]-4'-nitrodiphenylether (Obtained according to example 2) are added 120 cc. of concentrated HCl and 400 cc. of water. Water vapor is now blown through this mixture until no further benzaldehyde is separated together with the condensed water vapor. The remaining residue is filtered and the free base precipitated by addition of a concentrated aqueous solution of NaOH. There are obtained 210 g. of aminonitro-diphenylether. M.p.=130°–133° C.

Two hundred ten g. of 4-amino4'-nitrodiphenylether obtained according to the process described above in 500 cc. of dimethylformamide are hydrogenated in the usual manner in the presence of a raney-nickel catalyst. At the end of the hydrogenation, the catalyst is filtered off and the reaction product is precipitated by the addition of water. There are obtained 170 g. of 4,4'-diamino-diphenylether. M.p. 187°–190° C.

The diamino compound can be used for the preparation of dyestuffs and further more for preparing of polyimide molded bodies as described in German Pat. specification No. 1,202,981.

Also the other aldimino- and ketimino-nitroaryl ethers, obtainable according to the process of this invention can be transformed in the same manner as described above into amino compounds, which can be used in the same manner as mentioned above.

The following examples illustrate the invention.

EXAMPLE 1

Seven hundred eighty-eight g. of 4-[benzylidene-imino]-phenol and 770 g. of 3,4-dichloronitrobenzene are dissolved in 2,000 cc. of dimethyl sulfoxide. A solution of 224 g. of potassium hydroxide in 336 cc. of water is then added dropwise with cooling at around 25° C., and the resulting reaction mixture is heated to 120° C. and stirred at this temperature for a period of 10 hours. The ether crystallizes out on cooling in the form of a yellow substance melting at 72°–80° C. Some more of the ether is obtained by precipitation from the mother liquor with water. The product is then washed with water, giving 1,388 g. of 4[benzylidene-imino]-2'-chloro-4'-nitrodiphenylether (=98 percent of the theoretical). M.p.=85°–86° C. after recrystallization from ethanol.

| Analysis: | $C_{19}H_{13}ClN_2O_3$ | | (molecular weight 352.8) | |
|---|---|---|---|---|
| Calculated: | C 64.7 % | H 3.7 % | Cl 10.1 % | N 7.9 % |
| Found: | C 65.1 % | H 3.8 % | Cl 10.3 % | N 8.0 % |

EXAMPLE 2

One hundred ninety-seven g. of 4-[benzylidene-imino]-phenol are dissolved in 500 cc. of dimethyl sulfoxide. A solution of 59 g. of potassium hydroxide in 84 cc. of water is then added dropwise, after which 100 cc. of the mixture of dimethyl sulfoxide and water are distilled off in vacuo. One hundred fifty-eight g. of 4-chloro-nitrobenzene are then introduced, followed by 8 hours' heating to 100° C. The ether recrystallizes out on cooling in the form of yellow polyhedrons which are suction-filtered and washed with water. The product has a melting point of 133°–135° C. which does not change on recrystallization from ethanol. Some more 4-[benzylidene-imino]-4'-nitrodiphenylether is then precipitated from the mother liquor with 130 cc. of water, giving a total yield of 300 g. or 94 percent of the theoretical.

| Analysis | $C_{19}H_{14}O_3N_2$ | | (Molecular weight) |
|---|---|---|---|
| Calculated: | C 71.7% | H 4.4% | N 8.8% |
| Found: | C 71.4% | H 4.5% | N 8.6% |

A stoichiometric quantity of sodium hydroxide may be used instead of the potassium hydroxide.

EXAMPLE 3

Two hundred twenty-four g. of potassium hydroxide in 336 cc. of water are added dropwise at room temperature to a solution of 788 g. of 4-[benzylidene-imino]-phenol and 632 g. of 2-chloronitrobenzene in 2,000 cc. of dimethyl sulfoxide. The mixture is then stirred for 12 hours at 120° C. and allowed to cool. One hundred cc. of water are then added and the reaction product which crystallizes out is suction-filtered. 4-[benzylidene-imino]-2'-nitrodiphenylether melting at 85°–86° C. is obtained in a yield of 855 g. M.p.: 91°–93° C. after recrystallization from ethanol.

| Analysis: | $C_{19}H_{14}O_3N_2$ | | (molecular weight) |
|---|---|---|---|
| Calculated: | C 71.7% | H 4.4% | N 8.8% |
| Found: | C 71.6% | H 4.6% | N 8.9% |

EXAMPLE 4

Fifty-six g. of potassium hydroxide in 84 cc. of water are added dropwise at room temperature to a solution of 197 g. of 4-[benzylidene-imino]-phenol in 500 cc. of dimethyl sulfoxide. One hundred cc. of the solvent mixture are then distilled off in a water jet vacuum, followed after cooling by the addition of 202 g. of 1-chloro-2,4-dinitrobenzene. The reaction mixture is then stirred for 6 hours at 70° C., followed by precipitation with water. 4-[benzylidene-imino]-2',4'-dinitrodiphenylether is obtained in the form of a yellow substance after washing with ethanol.

Analysis:      $C_{19}H_{13}N_3O_3$      (molecular weight 363.3)
Calculated:   N 11.6%
Found:        N 11.8%

EXAMPLE 5

One hundred ninety-seven g. of 4-[benzylidene-imino]-phenol, 158 g. of 4-chloronitrobenzene and 152 g. of potassium carbonate are heated for 8 hours to 120° C. in 250 cc. of dimethyl sulfoxide. Any water formed during the reaction is distilled off over a bridge. After cooling, the product is stirred with 150 cc. of water and suction-filtered and the filtration residue is washed with water. 4-[benzylidene-imino]-4'-nitrodiphenyl-ether is obtained in a yield of 312 g. or 98 percent of the theoretical. M.p.: 125°–130° C.

Analysis:      $C_{19}H_{14}O_3N_2$      (Molecular weight)
Calculated:   N 8.8%                    found: N 8.5%

EXAMPLE 6

One hundred nine g. of p-aminophenol are added to 106 g. of freshly distilled benzaldehyde in 600 cc. of dimethyl sulfoxide, and the resulting mixture is stirred for 1 hour at 100° C. The product is allowed to cool, 157 g. of 4-chloronitrobenzene being added thereto. This is followed by the dropwise addition of 140 g. of 40 percent potassium hydroxide. The mixture is then heated for 6 hours to 125° C. The ether crystallizes out on cooling, is suction-filtered and is then washed with water in order to remove the potassium chloride. 4-[benzylidene-imino]-4'-nitrodiphenylether is obtained in a yield of 264 g. or 83 percent of the theoretical. M.p.: 130°–133° C.

Analysis:      $C_{19}H_{14}O_3N_2$      (molecular weight 318.3)
Calculated:   N 8.8%
Found:        N 9.0%

What we claim is:
1. Compound of the formula

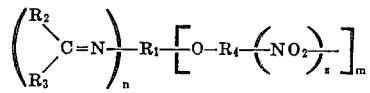

wherein $R_1$ is phenyl, $R_2$ is phenyl, $R_3$ is hydrogen, $R_4$ is selected from the group consisting of phenyl and chlorophenyl, $m$ is one, $n$ is one, and $z$ is one to two.

2. Compound according to claim 1 wherein such compound is selected from the group consisting of 4-(benzylidene-imino)-2'-chloro-4'-nitro-diphenyl ether, 4-(benzylidene-imino)-4'-nitro-diphenyl ether, 4-(benzylidene-imino)-2'-nitro-diphenyl ether, and 4-(benzylidene-imino)-2',4'-dinitro-diphenyl ether.

* * * * *